United States Patent

[11] 3,579,793

| [72] | Inventors | Charles A. Williams<br>Highland, Mich.;<br>Richard E. Waller, Erie, Pa. |
|---|---|---|
| [21] | Appl. No. | 761,979 |
| [22] | Filed | Sept. 24, 1968 |
| [45] | Patented | May 25, 1971 |
| [73] | Assignee | Microdot Inc.<br>Greenwich, Conn. |

[54] POWER TOOL FOR THREAD INSERTS
11 Claims, 6 Drawing Figs.

| [52] | U.S. Cl. | 29/240.5 |
|---|---|---|
| [51] | Int. Cl. | B23p 19/04 |
| [50] | Field of Search | 29/240.5, 227 |

[56] References Cited
UNITED STATES PATENTS

| 2,371,622 | 3/1945 | Hawkins | 29/240.5 |
| 2,855,661 | 10/1958 | Forster | 29/240.5 |
| 3,093,895 | 6/1963 | Eddy | 29/240.5 |
| 3,111,751 | 11/1963 | Eddy | 29/240.5 |

*Primary Examiner*—Lester M. Swingle
*Assistant Examiner*—J. C. Peters
*Attorney*—Harness, Dickey & Pierce ABSTRACT: The power tool has a shaft which engages and advances an insert into an aperture of a workpiece in one direction of rotation and screws the threaded end of the shaft from the insert in the other direction of rotation. The distance of advancement of the insert and the threaded aperture of the workpiece is controlled by a stop collar that is adjustable on the exterior of the tool for causing cam means to interrupt the drive of the shaft when the insert has been advanced a required distance.

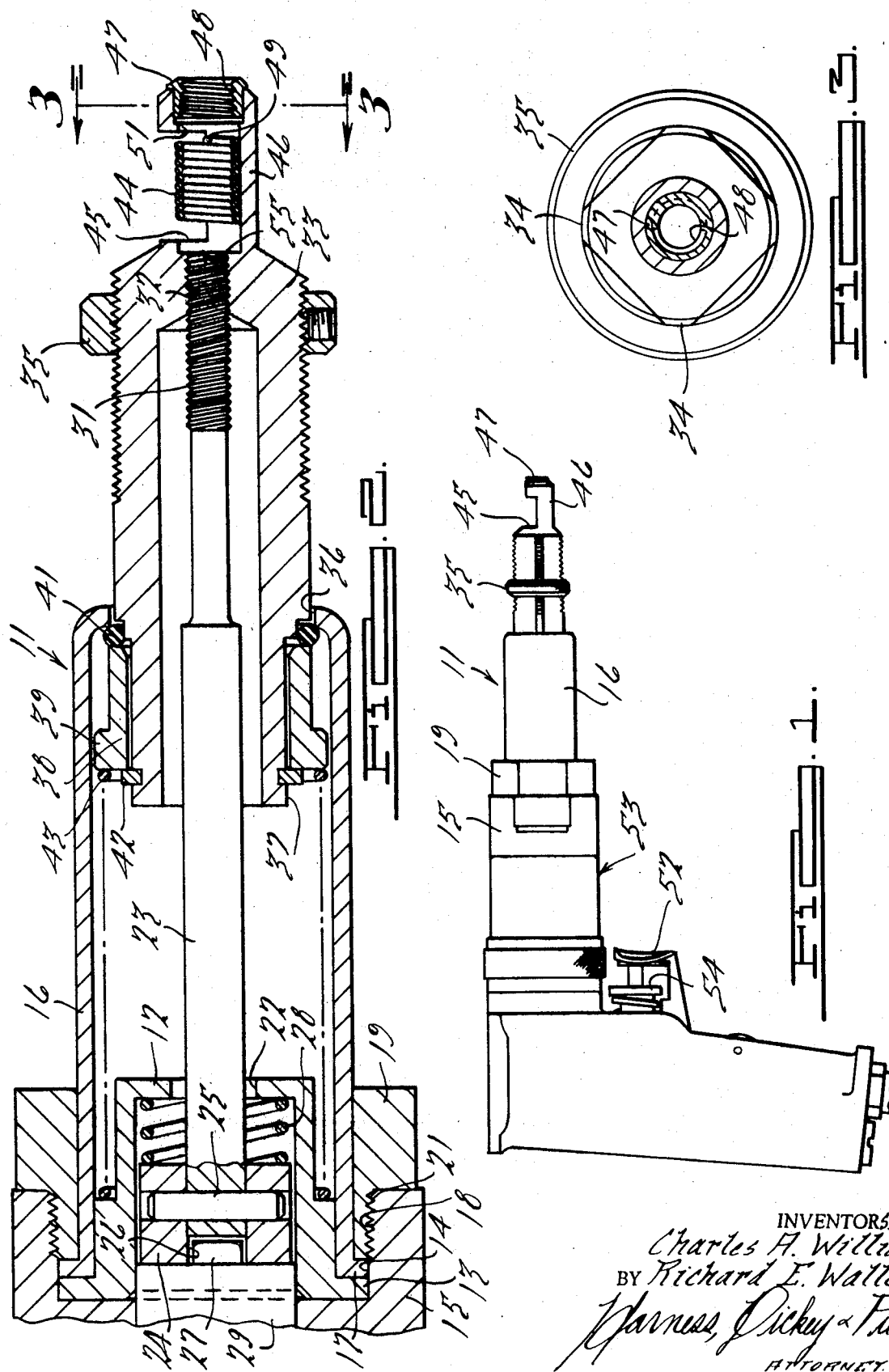

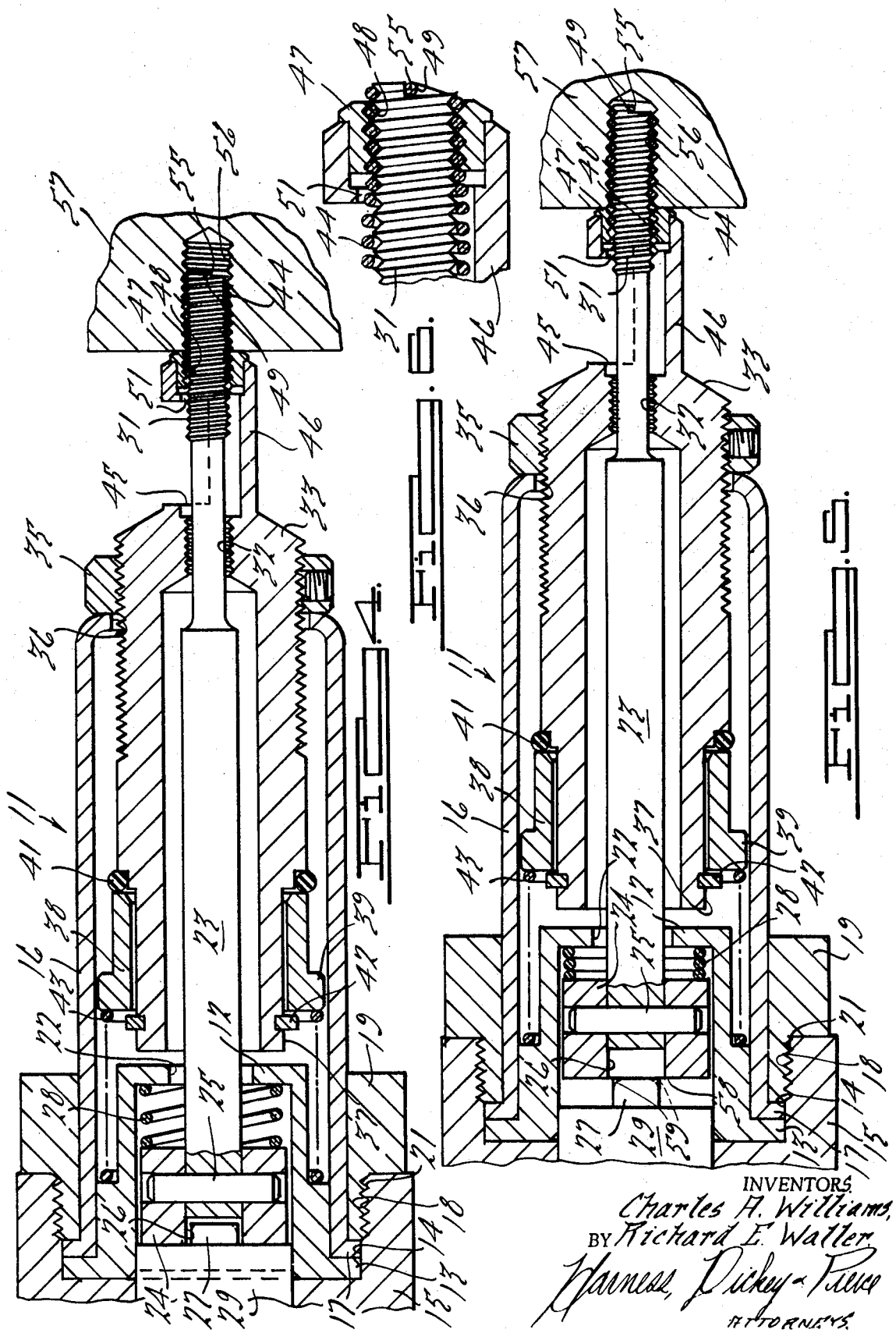

3,579,793

POWER TOOL FOR THREAD INSERTS

RELATED APPLICATION

Reference may be had to the application for Letters Patent of R. L. Thurston et al., Ser. No. 570,935, filed Aug. 8, 1966, for "Helical Coil Insert Tool," which was assigned to the assignee of the present invention and now abandoned.

BACKGROUND OF THE INVENTION

Reference may be had to the J. R. Hawkins U.S. Pat. No. 2,371,622 of Mar. 20, 1945, to show a power driven tool for an insert over which the tool of the present invention is an improvement.

SUMMARY OF THE INVENTION

The invention pertains to a powered tool for screwing a threaded insert into a threaded aperture in a workpiece. The insert is made of wire which is coiled as a spring with a tang at the bottom extending inwardly substantially on a diameter. After the insert is screwed into the thread of an aperture of a workpiece of soft material, it forms a hard thread therein. The tool has a shaft driven in rotation by a motor and is provided with a threaded end having an overall diameter which permits the threaded end to be relatively advanced longitudinally into the insert until a cam end thereof engages the tang and rotates the insert therewith. A collar on the end of the tool reduces the diameter of the coils of the insert as they engage a thread in the collar and the thread on the end of the shaft in position to be advanced within the workpiece aperture a desired distance through the continuous rotation of the shaft. Initially, the thread on the end of the shaft is in engagement with a thread of a carrier having the threaded collar on the forward end. Initially the carrier is in advanced position with the collar spaced from the threaded end of the shaft to permit the insert to be placed thereon. An external adjustable ring is provided on the carrier for limiting its retraction and therefor the advancement of the insert into the threaded aperture of the workpiece. Upon the rotation of the shaft, the carrier is retracted advancing the insert over the threaded end until it engages the insert tang after which the insert rotates therewith and is advanced within the thread of the collar. Thereafter, the threaded end of the shaft moves beyond the thread of the carrier which is being further retracted by the advancement of the insert in the collar thread and that of the workpiece aperture until the adjusted ring on the carrier strikes a stop and prevents a further retraction of the carrier. A spring under the driving head of the shaft will start compressing as the insert approaches the bottom of the workpiece aperture until the driving engagement between the motor and shaft is broken by the camming of the driving fingers on the motor from the slot in the shaft head. The engagement between the fingers and slot is such that upon the reversal of the motor the fingers will engage and rotate the shaft in the opposite direction to screw the thread at the end of the shaft out of the installed insert. The expansion of the spring beneath the shaft head produces engagement of the threaded end of the shaft with the thread of the carrier. Thereupon the continued rotation of the shaft advances the carrier to the initial position where the next to be applied insert can be placed upon the threaded collar.

BRIEF DESCRIPTION OF THE DRAWINGS

FIG. 1 is a view in elevation of a motor having the tool thereon for advancing and applying an insert;

FIG. 2 is a sectional view of the tool of FIG. 1, on the forward end of the motor;

FIG. 3 is a sectional view of the structure illustrated in FIG. 2, taken on the line 3—3 thereof;

FIG. 4 is a view of the structure illustrated in FIG. 2 just prior to the completion of the driving operation;

FIG. 5 is a view of the structure illustrated in FIG. 4 at the time of completing the driving operation, and FIG. 6 is an enlarged broken view of the structure, illustrated in FIG. 2 after the insert has been advanced into the collar with the turns located between the thread of the collar and shaft.

DESCRIPTION OF THE PREFERRED EMBODIMENT

The power tool 11 has a cuplike element 12 containing a flange 13 which extends within an aperture 14 at the end of a motor housing 15. A sleeve 16 extends over the cuplike element 12 having an outwardly extending flange 17 which extends within the aperture 14 and abuts the flange 13. A left-hand thread 18 is disposed inwardly at the end of the aperture 14. A collar 19 has a left-hand thread 21 thereon which is screwed upon the thread 18 in the aperture 14 to clamp the two flanges 13 and 17 therewithin. The cuplike element 12 has a central aperture 22 in the bottom through which a shaft 23 extends. The upper end of the shaft has a driving collar 24 secured thereto by a pin 25. The collar 24 has a slot 26 extending inwardly from the end in which a pair of driving fingers 27 of the motor extend in driving relation to the shaft. A spring 28 rests upon the bottom of the cuplike element 12 and engages the bottom of the collar 24 for urging the collar and shaft toward the motor. The fingers 27 are located on the end of a motor shaft 29 which is driven in forward and reverse rotation.

The lower end of the shaft 23 contains a thread 31 which mates with a thread 32 of a carrier 33 which is square in section as illustrated in FIG. 3, having a thread 34 at the corners. An adjustable ring 35 is threaded on the thread 34 and provides external adjustment for controlling the degree of advancement of the insert when screwed into the threaded aperture of a workpiece. A square opening 36 is provided at the end of the sleeve 16 for preventing the rotation of the carrier 33 as it is advanced and retracted relative to the sleeve.

The upper end of the carrier 33 has a cylindrical end 37 on which a sleeve 38 is mounted having a flange 39 which guides on the inner surface of the sleeve 16. An O-ring 41 is mounted on the carrier 33 below the sleeve 38 for forming a stop abutment and a vibration damper for the sleeve 38 which is secured on the end 37 by a split spring washer 42. A spring 43 is disposed between the sleeve 38 and the cuplike element 12. Upon the advancement of the carrier 33 to the position illustrated in FIG. 2, the O-ring 41 engages the sleeve 16 about the square opening 36 and the compression of the O-ring will slow or stall the motor when the carrier has been advanced a maximum amount. The retraction of the threaded end 31 need only be sufficient to permit the insert 44 to be passed into a cutaway portion 45 in a cylindrical extension 46 at the forward end of the carrier 33.

The forward end of the cylindrical extension 46 has a collar 47 brazed therein containing a thread 48 having a diameter to receive the coil of the insert after the diameter thereof has been reduced in a manner pointed out in the copending application. After the insert has been placed on the collar 47, the shaft 23 is driven clockwise to retract the carrier 33 which advances the insert over the threaded end 31 of the shaft until the cam end 55 of which engages a tang 49 at the lower end of the insert to cause the insert to rotate therewith. The coils of the insert will be reduced in diameter when snaked along an inner wall 51 of the sleeve extension 46 into the thread 48 of the collar 47 and into engagement with the thread 31 of the shaft, as disclosed in the above-mentioned copending application. The thread of the collar 47 must be shifted a half pitch relative to the thread of the threaded end 31 of the shaft 23 so that the turns of the insert can extend into roots thereof. To this end, as illustrated in FIG. 6, the insert 44 is threaded on the threaded end 31 and the thread 48 of the collar 47 to obtain the alignment of the crown and roots of the threads. The collar 47 is then brazed or otherwise secured to the cylindrical extension 46 to retain this relationship between the threads.

After the insert 44 has been inserted through a recess 45 and placed in alignment with the threaded end 31 of the shaft 23, an outer trigger 52 of the driving motor 53 is pulled rearwardly against an inner trigger 54 to drive the shaft 23 clockwise. This retracts the carriage 33 and moves the insert 44 over the threaded end 31 until the cam end 55 engages the tang 49. This causes the insert 44 to rotate with the threaded end 31 and the turns of the insert are contracted when engaged within the inner wall 51 of the extension 46. The continuous retraction of the carrier 33 causes the turns of the insert to engage the turns of the threads of the threaded end 31 and the thread 48 of the collar. Thereupon, the thread of the threaded end 31 separates from the thread 32 of the carrier and the retraction thereof is continued by the advancement of the coils of the insert 44 in the thread 48 of the collar. The insert will pass beyond the thread 48 and enter a threaded aperture 56 in a workpiece 57. The retraction of the carriage will continue until the collar 35 adjusted thereon strikes the end of the sleeve 16 whereupon the shaft 23 will be advanced by the compression of the spring 28 until cam corners 59 on the opposite edges of the fingers 27 and the walls of the slot 26 permit the fingers 27 to pass out of the slot 26 and interrupt the drive. A slight play in the engagement between the threads and the insert will produce a clicking sound as the fingers 27 pass over the slot 26 to apprise the operator that the insert has been set properly within the aperture 56. Thereupon, the further movement of the trigger 52 will operate the trigger 54 and reverse the drive of the motor. The opposite square edges on the fingers 27 and the wall of the slot 26 will engage and drive the shaft counterclockwise. The threaded end of the shaft will screw out of the insert and the spring 28 will expand to move the head outwardly to have the fingers 27 move deeper into the slot 26 and the thread of the threaded end 31 into engagement with the thread 32 of the carrier 33. This advances the carrier 33 from the position illustrated in FIG. 5, to the position illustrated in FIG. 2, in which position the O-ring 41 engages the edges of the sleeve 16 about the square hole 36 and slows or stalls the motor. A skilled operator will advance the carrier to a position sufficient to receive a new insert 44 rather than have it move to its fully extended position where the motor might stall.

The power tool of the present invention is so constructed as to obviate the necessity of dismantling parts of the tool in order to change the adjustment thereof. The exterior ring 35 is readily adjustable on the carrier 33 to calibrate the tool thus eliminating shims and other adjusting means within the interior of the tools heretofore employed. The contraction of the coils of the inserts permits the threaded end 31 of the shaft to pass into the insert to have the end engage the tang at the bottom thereof. The contraction of the insert moves the turns thereof into the roots of the thread in the collar and that of the threaded end which separates from the thread of the carrier which is thereafter retracted by the thread engagement of the insert. The advance of the insert in the thread of the collar and that of the workpiece aperture continues the retraction of the carrier until the ring engages a stop after which the cam means is operated to separate the drive between the motor and shaft. The cam means is so constructed as to connect the drive between the motor and shaft upon the reversal of the motor so as to have the threaded end screwed from the threads of the installed insert. The spring under the shaft head retracts the shaft and reengages the threaded end with the thread of the carrier which is thereafter advanced to its initial position in which a new insert may be placed in the extended end of the carrier in preparation for the next installation thereof.

The insert 44 is herein shown as having been made from a wire which is circular in cross section, the one in the copending application is illustrated as being of oval shape. It is to be understood that the cross-sectional shape of the wire of the insert may be of rhomboidal or any shape which will fit between the threads of the threaded end 31 of the shaft and the thread 48 of the sleeve 47.

We claim:

1. In a motor driven power tool for applying an insert to a threaded aperture of a workpiece, a rotatable shaft having a threaded end and a slot in the end, a body having an internal thread engaged by said shaft thread, a sleeve slidable over said body which prevents the body from rotating, a threaded collar on the end of the body extending beyond a recessed portion in which the insert can be placed and through which the threaded end is advanced by said thread engagement until said end slot engages a tang on the forward end of the insert which is rotated and advanced therewith, an adjustable stop on said body engageable by the sleeve near the end of the advancement of the insert into the aperture of a workpiece, and a clutch at the end of the shaft opposite to that having the thread which disconnects the drive to the shaft as the shaft continues to advance after the advancement of the sleeve is interrupted.

2. In a motor driven power tool as recited in claim 1, wherein a reversible motor drives the shaft through said clutch, and means for reversing the motor to reengage the clutch and to drive the shaft in a reverse direction to screw the threaded end from the insert.

3. In a motor driven power tool as recited in claim 2, wherein an adjustable ring on the body limits the advancement of the sleeve relative thereto.

4. In a motor driven power tool as recited in claim 3, wherein upon engagement of the sleeve with the ring, the shaft continues to rotate and advance until the clutch is disengaged to interrupt the shaft rotation and its advancement.

5. In a motor driven power tool as recited in claim 4, wherein the interruption of the drive for the shaft by the clutch produces a clicking sound to apprise the operator of the completion of the operation.

6. In a motor driven power tool as recited in claim 1, wherein the threaded end moves out of engagement with the thread of the body upon the advancement of the insert within the thread of the aperture of the workpiece which continues the advancement of the sleeve.

7. In a motor driven power tool as recited in claim 6, wherein a head is provided on the end of the shaft adjacent to the motor, a spring beneath the head, and a releasable connection between the motor and shaft head which is released at the end of the advancement of the shaft by the insert after the thread of the shaft is disengaged from those of the body to complete the insertion operation.

8. In a motor driven power tool as recited in claim 7, wherein the head contains a slot and wherein the motor has a finger extending into the slot, cam means on the driving and driven sides of the finger and head which moves the head further downwardly to cam the fingers from the slot after the slot moves down with the head at the end of the insertion operation.

9. In a motor driven power tool as recited in claim 8, wherein the reversal of the motor provides connection with the ends of the wall of the slot and the finger portions having no cam thereon which reverses the rotation of the shaft and screws the threaded end thereof out of the insert.

10. In a motor driven power tool as recited in claim 9, wherein the head is retracted by the spring to reconnect the threaded end of the shaft with the thread in the body and move the slot in the head over the finger which drives the shaft in reverse rotation to advance the body to its initial position for receiving the next insert to be installed.

11. In a motor driven power tool as recited in claim 1, wherein the thread of the collar is located relative to the thread of the threaded end of the shaft by the insert therebetween, and means for securing the collar in fixed relation to the end of the body while the insert is positioned between said threads.